(12) United States Patent
Kreek et al.

(10) Patent No.: US 7,701,434 B2
(45) Date of Patent: Apr. 20, 2010

(54) AUTOMATIC SCREEN AND KEYPAD BRIGHTNESS ADJUSTMENT ON A MOBILE HANDHELD ELECTRONIC DEVICE

(75) Inventors: Conrad Aleksander Kreek, Waterloo (CA); Jerry Mailloux, Waterloo (CA); Ahmed Hashi, Waterloo (CA); James Robinson, Elmira (CA); Ken Wu, Burlington (SG); Robert J. Lowles, Waterloo (CA); Andrew Bocking, Waterloo (CA); Dale Brubacher-Cressman, New Hamburg (CA); Bruce Winter, St. Agatha (CA)

(73) Assignee: Research in Motion Limited, Waterloo, Ontario (CA)

( * ) Notice: Subject to any disclaimer, the term of this patent is extended or adjusted under 35 U.S.C. 154(b) by 822 days.

(21) Appl. No.: 11/261,708

(22) Filed: Oct. 31, 2005

(65) Prior Publication Data

US 2007/0097065 A1    May 3, 2007

(51) Int. Cl.
*G09G 3/36* (2006.01)
(52) U.S. Cl. .................. 345/102; 348/602
(58) Field of Classification Search ............. 345/102; 348/227.1, 602
See application file for complete search history.

(56) References Cited

U.S. PATENT DOCUMENTS

| | | | |
|---|---|---|---|
| 5,617,112 A | 4/1997 | Yoshida et al. | |
| 6,507,286 B2 * | 1/2003 | Weindorf et al. | 340/815.75 |
| 6,664,744 B2 * | 12/2003 | Dietz | 315/291 |
| 6,798,395 B1 | 9/2004 | Yamauchi et al. | |
| 6,801,811 B2 | 10/2004 | Ranganathan et al. | |
| 6,816,141 B1 * | 11/2004 | Fergason | 345/88 |
| 6,959,208 B2 | 10/2005 | Tanaka et al. | |
| 2002/0050974 A1 * | 5/2002 | Rai et al. | 345/102 |
| 2005/0041139 A1 * | 2/2005 | Lowles | 348/362 |

(Continued)

FOREIGN PATENT DOCUMENTS

CA    2537909    8/2006

(Continued)

OTHER PUBLICATIONS

EP Search Report of Jan. 21, 2008, issued in corresponding EP patent application.

(Continued)

*Primary Examiner*—Amare Mengistu
*Assistant Examiner*—Premal Patel
(74) *Attorney, Agent, or Firm*—Perry+Currier Inc.; Stephen J. Perry

(57) ABSTRACT

A method is set forth for automatically adjusting screen and keypad brightness on a mobile electronic device having a light sensor, display screen and keypad, for optimum legibility under varying lighting conditions, with minimal eye strain and distraction to the user. The method includes obtaining light level samples from the light sensor, and independently adjusting backlight intensity of the display screen and keypad responsive to the light level samples. Preferably, correct screen and keypad adjustments are made responsive to the user pulling his or her handheld device out of its holster notwithstanding non-optimal ambient light detection while the device is being removed from the holster. According to another aspect, the described method allows for ambient light detection in a handheld device where the light sensor and a message notification indicator share a common light pipe.

12 Claims, 6 Drawing Sheets

U.S. PATENT DOCUMENTS

| | | | |
|---|---|---|---|
| 2005/0051708 A1* | 3/2005 | Hotelling | 250/214 AL |
| 2005/0102334 A1* | 5/2005 | Honda | 708/202 |
| 2005/0190142 A1* | 9/2005 | Ferguson | 345/102 |
| 2005/0225983 A1* | 10/2005 | Fornell | 362/276 |

FOREIGN PATENT DOCUMENTS

| | | |
|---|---|---|
| EP | 1 303 113 A2 | 4/2003 |
| EP | 1 505 567 A1 | 2/2005 |
| WO | WO 00/41378 A | 7/2000 |

OTHER PUBLICATIONS

PALM-Support-Palm m505 and m500 Backlight Utility, www.palm.com, pp. 1-2, posted Jun. 14, 2001.

MSDN, Program Applications to Turn the Smartphone Backlight Off and On, http://msdn.microsoft.com/en-us/library/aa455153(printer).aspx.

Ferguson, Bruce, Portable Design, Jan. 2004.

* cited by examiner

AUTOMATIC SCREEN AND KEYPAD BRIGHTNESS ADJUSTMENT ON A MOBILE HANDHELD ELECTRONIC DEVICE

FIELD

The present application relates generally to electronic devices and more particularly to a method for automatically adjusting screen and keypad brightness on a mobile electronic device.

BACKGROUND

Liquid crystal display (LCD) screen and keypad brightness on a handheld electronic device may be adjusted for different operating environments in order to provide an optimal user experience. For example, in outdoor or sunlight conditions the LCD backlight must be very bright in order to be readable, and the keypad backlight should be off to conserver battery power. In normal indoor or office conditions, the LCD backlight should operate at medium brightness while the keypad backlight is usually turned off. In dim or dark conditions, the LCD backlight must be at low intensity so as to avoid eye strain and the keypad backlight must be on.

Ambient lighting conditions can change rapidly as the user moves between different working environments. For example, walking from indoors to outdoors may render the LCD screen immediately unreadable unless the LCD backlight brightness is increased. Conversely, when the user moves from a bright environment into a dimly lit room, the keypad may be unreadable unless the keypad backlight is turned on.

Prior art arrangements have been implemented in GPS displays and laptop computers for providing basic automatic screen and keypad backlighting adjustment. However, none of such prior art backlighting algorithms are known to address independent control of LCD and keypad backlighting adjustment as a user moves between different ambient lighting conditions. Moreover, none of the known prior art addresses the problem of providing rapid backlight adjustment in response to a user removing his or her handheld electronic device from a wearable holster accessory, or the problem of detecting ambient light when the light sensor and message notification indicator for the device share a common light pipe, such as described in co-pending U.S. patent application Ser. No. 11/187,867, filed Jul. 25, 2005, and entitled SHARED LIGHT PIPE FOR A MESSAGE INDICATOR AND LIGHT SENSOR.

BRIEF DESCRIPTION OF THE DRAWINGS

The method for automatically adjusting screen and keypad brightness on a mobile handheld electronic device will be better understood with reference to the following description and to the Figures, in which.

DETAILED DESCRIPTION OF THE EMBODIMENTS

Figure 1:
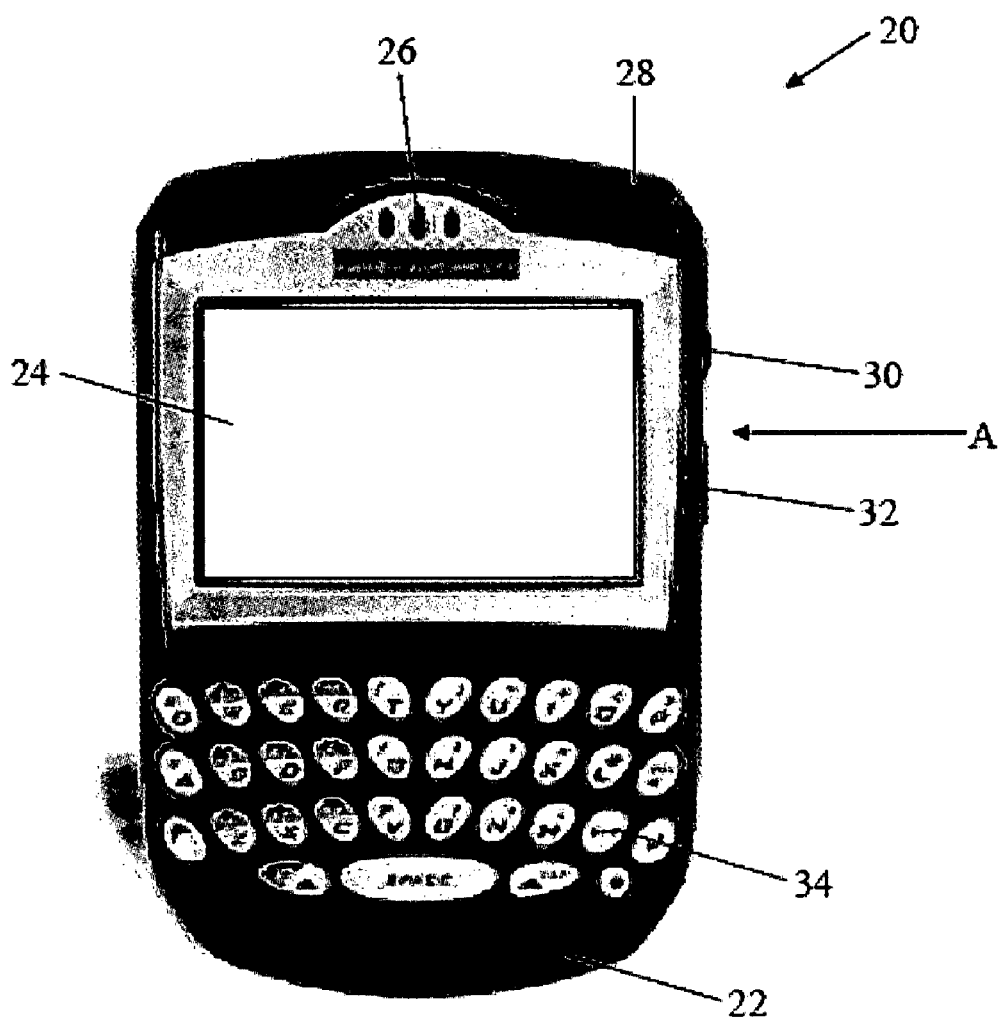
FIG. 1 is a representation of a mobile handheld electronic device in connection with which a method for automatically adjusting screen and keypad brightness is set forth in accordance with one embodiment.

Referring to FIG. 1, a mobile handheld electronic device is indicated generally by the numeral 20. In the present embodiment, the electronic device 20 is based on the computing environment and functionality of a wireless personal digital assistant. It will be understood, however, that the electronic device 20 is not limited to a wireless personal digital assistant. Other electronic devices are possible, such as desktop computers, cellular telephones, GPS receivers, smart telephones, and laptop computers. Referring again to the present embodiment, the electronic device 20 includes a housing 22 that houses a mechanical vibration means (not shown) and frames an LCD display 24, a speaker 26, a message notification indicator 28, a track wheel 30, an exit key 32 and a keypad 34. Preferably, the message notification indicator 28 is in the form of a light pipe having two internal branches terminating respectively in a Light Emitting Diode (LED) and an ambient light sensor, as set forth in co-pending U.S. patent application Ser. No. 11/187,867, filed Jul. 25, 2005, and entitled SHARED LIGHT PIPE FOR A MESSAGE INDICATOR AND LIGHT SENSOR, the contents of which are incorporated herein by reference. The track wheel 30 and the exit key 32 can be inwardly depressed along the path of arrow "A" as a means of providing additional user-input. The housing 22 is made from a suitable material as will occur to those skilled in the art, and can be stored, for example, in a holster (not shown) that includes an attachment for attaching to a user's belt.

Figure 2:
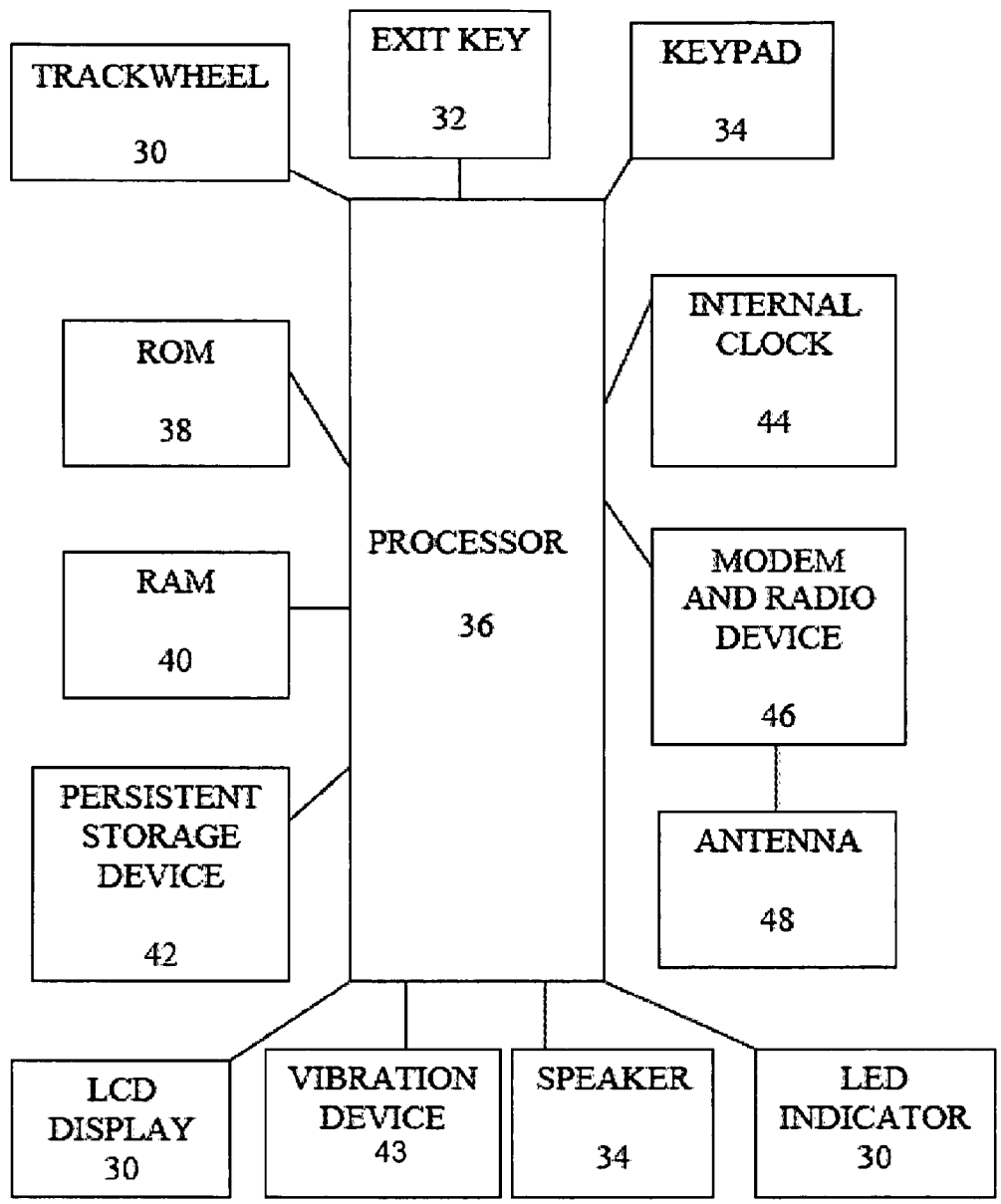
FIG. 2 is a block diagram of certain internal components within the electronic device of FIG. 1.

Referring now to FIG. 2, a block diagram is provided of certain internal components within the device 20. The device 20 is based on a microcomputer including a processor 36 connected to a read-only-memory (ROM) 38 that contains a plurality of applications executable by the processor 36 for enabling the device 20 to perform certain functions. The processor 36 is also connected to a random access memory unit (RAM) 40 and a persistent storage device 42 which are responsible for various non-volatile storage functions of the device 20. The processor 36 receives input from various input devices including the track wheel 30, the exit key 32, and the keypad 34. The processor 36 outputs to various output devices including the LCD display 24, the speaker 26, the indicator 28 and the mechanical vibration device 32. The processor 36 is also connected to an internal clock 44 and a modem and radio device 46. The modem and radio device 46 are used to connect to various wireless networks using an antenna 48.

Figure 3:
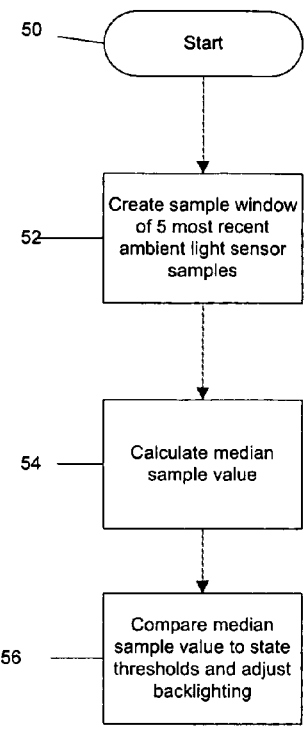
FIG. 3 is a flowchart showing steps in a method for automatically adjusting screen brightness in the electronic device of FIG. 1.

Reference is now made to FIG. 3, showing a flowchart of a method for automatically adjusting screen 24 and keypad 34 brightness on the mobile handheld electronic device of FIGS. 1 and 2. The method is implemented by an algorithm within an application executable by the processor 36 to correctly switch between three screen-specific ambient lighting modes (referred to herein as DIM, OFFICE and BRIGHT, respectively) and two keypad-specific ambient lighting mode (referred to herein as KEYPAD-ON and KEYPAD-OFF, respectively. The screen-specific modes are determined independently of the keypad-specific modes. In DIM mode, the screen 24 backlight is dimmed for low lighting environment. In OFFICE mode, the screen 24 backlight is set to a brightness suitable for an office environment. In BRIGHT mode, and the screen 24 backlight is set at full brightness, suitable for legibility in bright sunlight (as indicated below, KEYPAD-OFF mode is enabled whenever BRIGHT mode is enabled). In KEYPAD-ON mode, the keypad backlight is turned on. In KEYPAD-OFF mode, the keypad backlight is turned off. The DIM, OFFICE, BRIGHT, KEYPAD-ON and KEYPAD-OFF modes are determined by detected ambient light conditions and operate to set the backlights to appropriate operating states, as discussed in greater detail below.

Each ambient lighting mode has a corresponding brightness/state value as set forth in Table A, where "% PWM" represents the duty cycle of a pulse width modulated signal of variable base frequency dependent on the specified duty cycle, and "Lux range" represents the range of ambient lighting intensity (measured in Lux units, where Lux represents the amount of visible light per square meter incident on a surface) in which each mode operates:

TABLE A

| Screen Backlight Mode | DIM mode | OFFICE mode | BRIGHT mode |
|---|---|---|---|
| Lux range of ambient lighting | <70 | 16 < Lux < 4400 | 3000 < Lux |
| Screen backlight brightness | 3%-6.5% PWM (based on 10%-100% brightness defined in Screen/Keyboard options screen) | 10%-40% PWM (based on 10%-100% brightness defined in Screen/Keyboard options screen) | 100% PWM (this "overdrives" the backlight circuit) |

| Keypad Backlight Mode | KEYPAD-ON | KEYPAD-OFF |
|---|---|---|
| Lux range for ambient lighting | <250 | >60 |
| Keypad backlight state | ON | OFF |

As indicated in Table A, the screen 24 backlight is adjustable in 5 or 10 discreet steps between 3% and 6.5% PWM, an additional 5 or 10 discreet steps between 10% and 40% PWM and may also be set to 100% PWM Backlight brightness control also permits a smoothly and quick fade (~200 ms) and a slow fade (1-1.5 s) between any of these steps (in addition to the off state). The keypad 34 backlight is adjustable in at least 5 discreet steps between 0% and 100% PWM, allowing for a smooth quick fade (200 ms) and a very slow fade (4-5 seconds, ideally) between each of these discreet levels and the off state.

Upon starting the algorithm (step 50) when the device 20 is turned on, the backlight mode is normally initialized to an appropriate mode using the ambient lighting sensed by the light sensor at that time. Next, light sensor samples are taken at set intervals and maintained in a buffer containing the five most recent samples at any given time (step 52). This buffer is referred to as the sample window because it is a moving window such that when each new sample is received, the oldest sample in the window is discarded from the buffer. The amount of time between each light sensor sample determines the sampling rate. A typical sampling rate is one sample per 1.2 seconds although in some situations the sampling rate may be increased to 400 ms temporarily for 5 samples to facilitate quick adjustment of the screen and keypad backlights. At step 54, the median sample value is calculated by sorting all samples in the sample window and choosing the middle value (i.e. the third sample in the window).

When each sample is received, a new median in the sample window is calculated and compared to various thresholds (step 56) to determine if a backlight adjustment is necessary, according to the thresholds listed in state Table B, where ADC represents Analog to Digital Converter output values:

TABLE B

| median light sensor ADC value | current mode is DIM | current mode is OFFICE | current mode is BRIGHT |
|---|---|---|---|
| <= 7 | n/a | Switch to DIM | Switch to DIM |
| >= 14 | switch to OFFICE | n/a | n/a |
| <= 450 | n/a | n/a | Switch to OFFICE |
| >= 650 | n/a switch to BRIGHT | Switch to BRIGHT | n/a |

Keypad backlight modes are handled independently from the LCD backlight modes:

| | current mode is KEYPAD-ON | current mode is KEYPAD-OFF |
|---|---|---|
| < = 16 | n/a | switch to KEYPAD-ON |
| >50 for 30 seconds | switch to KEYPAD-OFF | n/a |

The relationship between ADC threshold values expressed in Table B and light intensity values is as follows: ADC 7=16 Lux, ADC 14=70 Lux, 16 ADC=60 Lux, 50 ADC=250 Lux, ADC 450=3000 Lux, and ADC 650=4400 Lux. Operation of the state Table B is depicted in the flowcharts of FIGS. 4, 5 and 6.

Figure 4:
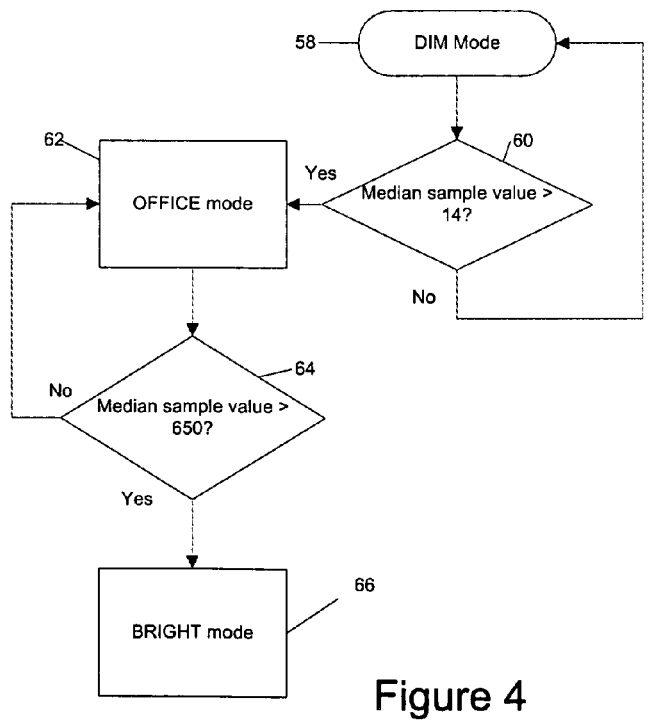
FIG. 4 is a flowchart showing steps in the method of FIG. 3 when the electronic device is in DIM mode.

Thus, as shown in FIG. 4, when the backlighting is in DIM mode, the median sample value is compared (step 58) to a threshold value of 14 (70 Lux) and if the value is greater than 14 OFFICE mode of backlight operation is selected (step 62) wherein the screen 24 backlight is at a brightness suitable for an office environment. However, if the median sample value is greater than 650 (step 64) then BRIGHT mode of backlight operation is selected (step 66) wherein the screen 24 backlight is set to full brightness.

Figure 5:
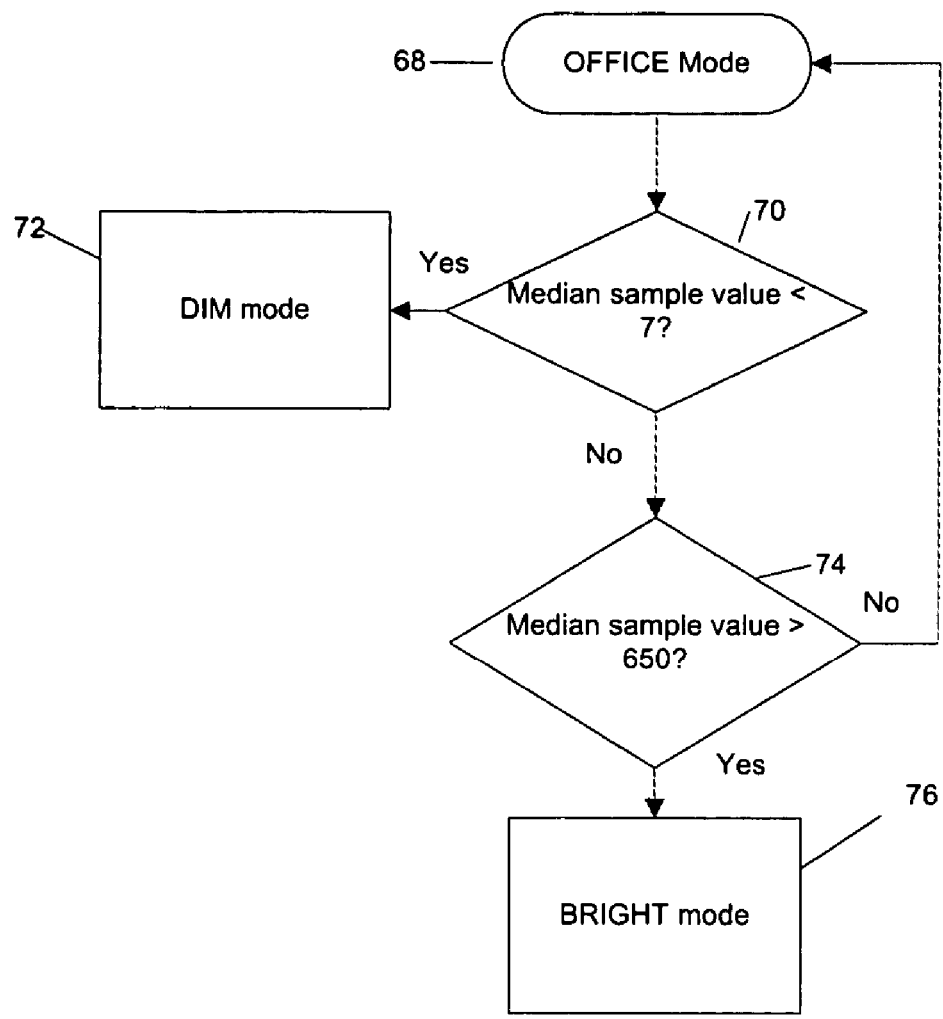
FIG. 5 is a flowchart showing steps in the method of FIG. 3 when the electronic device is in OFFICE mode.

As shown in FIG. 5, when the backlighting is in OFFICE mode (step 68), the median sample value is compared (step 70) to a threshold value of 7 (16 Lux) and if the value is less than 7 DIM mode of backlight operation is selected (step 72) wherein the screen 24 backlight is dimmed. However, if the median sample value is greater than 650 (step 74) then BRIGHT mode of backlight operation is selected (step 76) wherein the screen 24 backlight is set to full brightness.

Figure 6:
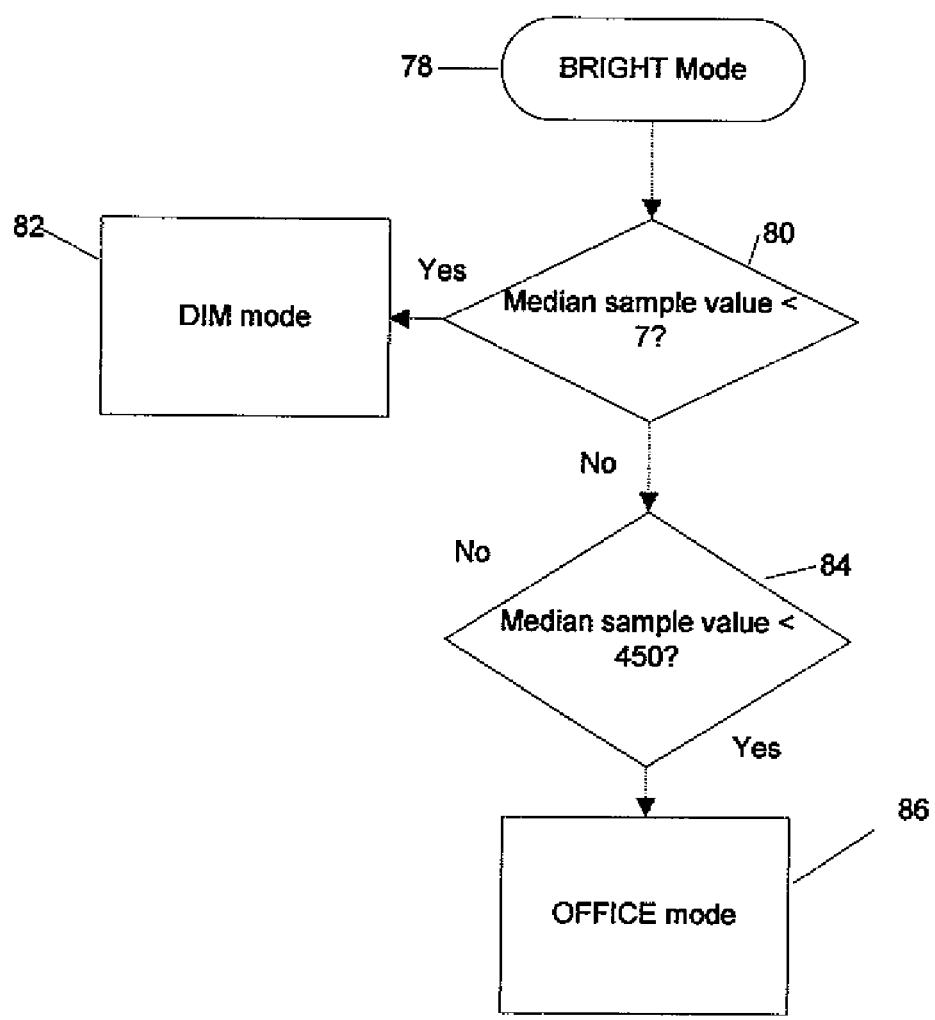
FIG. 6 is a flowchart showing steps in the method of FIG. 3 when the electronic device is in BRIGHT mode.

As shown in FIG. 6, when the backlighting is in BRIGHT mode (step 78), the median sample value is compared (step 80) to a threshold value of 7 and if the value is less than 7 DIM mode of backlight operation is selected (step 82) wherein the screen 24 backlight is dimmed. If the median sample value is less than 450 (step 84) then OFFICE mode of backlight operation is selected (step 86) wherein the screen 24 backlight is at a brightness suitable for an office environment.

From FIGS. 4 and 5, it will be noted that the threshold for changing from DIM mode to OFFICE mode is higher than the threshold for changing from OFFICE to DIM mode. This compensates for situations where the ambient lighting is hovering around a particular threshold value and prevents constant transitioning between backlight states. A similar hysteresis is integrated into the threshold values between the OFFICE and BRIGHT modes (FIGS. 5 and 6).

Figure 7:
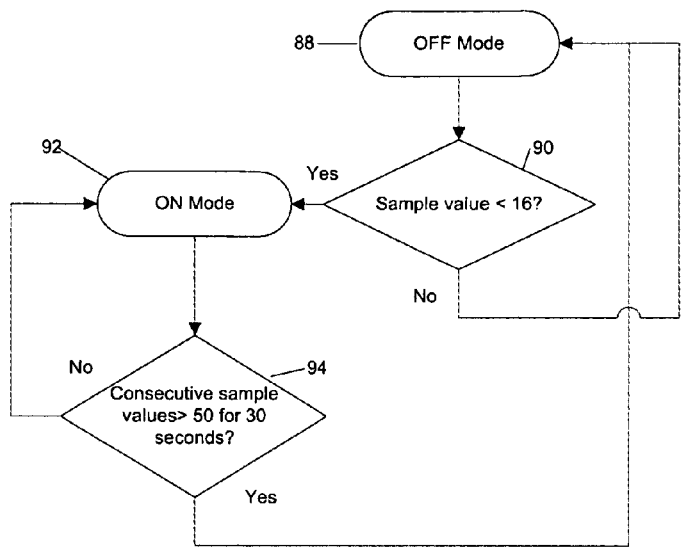
FIG. 7 is a flowchart showing steps for automatically adjusting keypad brightness in the electronic device of FIG. 1.

As indicated above, keypad 34 lighting is controlled independently of screen 24 backlighting to allow the keypad to respond more quickly to dim environments, and to allow the LCD screen to respond more quickly to office and bright or sunlight environments. Hence, it is possible for the screen backlight to be in OFFICE or BRIGHT mode while the keypad backlight is still in KEYPAD-ON mode (temporarily). As set forth in FIG. 7, while the keypad backlight is OFF (step 88), each sample value (rather than the median sample value) is compared (step 90) to a threshold value of 16 and if the value is less than 16 the keypad 34 backlight turns on right away (step 92). This ensures that the user does not have to wait to type if they are unable to see the keypad 34. This means that the keypad may sometimes turn on prematurely when the device 20 is not actually in a dim or dark environment but a single sample less than 16 is received for some reason. This ensures that the keypad 34 is never unusable, even though slightly more battery is drawn and the user may become slightly confused as to why the keypad backlight appears to turn on "randomly" in some circumstances. Ideally, the keypad 34 should turn on quickly (about 200 ms) after receiving a single "dim" sample but fade off very slowly so that it is barely noticeable (e.g. 5-10 seconds). This helps to remove distraction (and possible confusion) when the LCD screen 24 backlight is turned off.

While the keypad backlight is ON, consecutive sample values are compared (step 94) to a threshold value of 50 and once 30 seconds of contiguous samples greater than 50 have been received the keypad 34 is turned OFF (step 88). This avoids the possibility of "thrashing" the keypad backlight on and off in highly variable lighting environments, which would be quite distracting and annoying to the user.

By using the median sample in the sample window for mode-change decisions, brief lighting fluctuations (e.g. bright flashes lasting less than about 800 ms) are effectively filtered out while still providing an acceptably quick response to entering an area with bright sunlight or pulling the device out of the holster in bright sunlight. Transitioning through a dim environment for less than about 5 seconds is also ignored because all five samples in the sample window are required to be less than the threshold value for the currently active mode to affect a mode change. Since it takes several seconds for a user's eyes to adjust to a dimmer environment, the LCD screen 24 brightness is permitted by the algorithm to adjust gradually.

Figure 8:
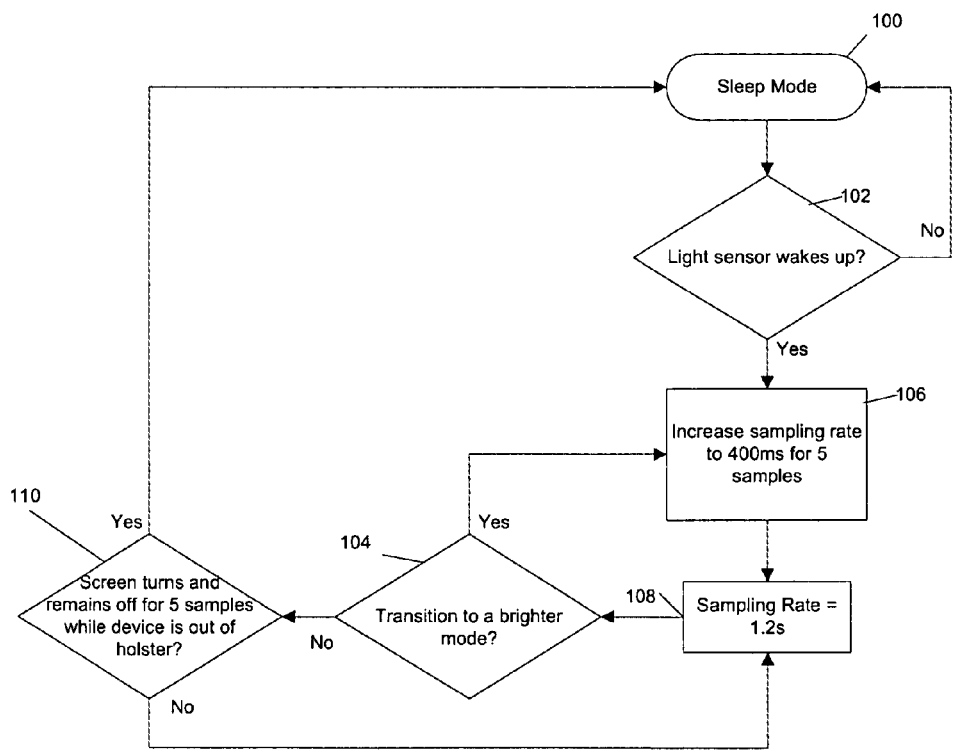
FIG. 8 is a flow chart showing steps for controlling sample rate for the methods of FIGS. 3 and 7.

As shown in FIG. 8, light sensor samples are not taken (i.e. sleep mode) while the device 20 is off or in the holster (step 100) in order to save battery life and because samples are not likely to be valid because the light sensor is likely covered by an arm (device 20 is in holster) or in a bag or a pocket. When the light sensor software "wakes up" (step 102), sampling and backlight adjustment begins (step 106) with a fast sampling rate (400 ms) for the next five samples. The first sample received is used to initialize the entire sample window, if the second sample is brighter than the first, then this value is used to initialize the entire sample window. If the third sample is brighter than the first two, then it is used to initialize the sample window.

Thereafter, the normal sampling rate is one sample every 1.2 seconds (step 108). Preferably, each light sensor sample is actually an average of multiple quick samples taken over a period of about 9 ms. More particularly, at least 8 ADC readings are taken over a 9 ms period so that they can be averaged out so as to increase the reliability of each sample and filter out small variances in AC indoor lighting.

When the device 20 is pulled out of its holster, removed from a pocket or bag, etc., it is highly likely that the light sensor will be temporarily partially covered by the user's hand or shirt. This means that the first couple samples could be below the threshold for transitioning to DIM mode, even if the device 20 is operating in the OFFICE mode. Likewise, the first couple of samples could be indicative of OFFICE mode even though the device is in a bright environment. However, it is nearly impossible for a brighter sample to be received when the device is in a dim environment. Hence, as discussed above, the entire sample window is initialized to the greatest sample when the device 20 out of the holster.

If the screen 24 turns off due to a system timeout or the power button being pressed, but the device 20 has not been yet been turned off or returned to its holster (step 110), then light sensor sampling reverts to sleep mode (step 100) provided the screen 24 does not turn back on within the time it takes to receive the next five samples. This five sample delay is provided because the screen 24 may time out while the user is reading the screen. It is common for a user to handle this situation by hitting a key to immediately wake up the screen again (which turns on the backlight). In this case, the sample window is not reset to sleep mode. If the LCD screen 4 stays off for more than a few seconds then the sample window is reset to sleep mode due to the likelihood that the device environment has changed.

Based on the foregoing, LCD screen 24 brightness responds to a change from a dimmer to a brighter environment within 800 ms to 2 seconds. This is the amount of time that it takes to receive three brighter samples (which sets the median of the 5-sample window). The first sample in a brighter environment triggers the fast 400 ms sampling rate (step 104). However, it can take up to 1.2 seconds before the first sample is received. LCD screen 24 brightness responds to a change from a brighter environment to a dimmer mode in about 6 seconds. It takes 5 consecutive samples in a dimmer mode to cause a transition to the new mode. When the screen 24 backlight brightness is adjusted downwardly, the backlight is slowly faded to the new brightness level. This fading takes from about 1 s to 1.5 s.

As discussed above in connection with FIG. 1, the light sensor and message indicating LED share a common light pipe. If the sampling algorithm of FIG. 8 requires a light sensor sample to be taken while the LED is on, then the sample is delayed until immediately after the LED turns off, unless the device 20 is in the process of being pulled out of its holster. In this case, an initial low light sample is "faked" if the LED is on while removing the device 20 from its holster, etc. so as not to delay turning on the LCD screen 24 backlight (which cannot occur until a sample has been received). Each LED on/off transition is controlled so that the state information can be provided to the automatic backlight software set forth herein of LED on/off transitions.

Preferably, coarse timers are used in the described method (e.g. +/−12.5% variance). The use of coarse timers minimizes the number of times the processor 36 must wake up due to timer events. Consequently, all times referred to in this specification are characterized by a possible error of +/−12.5%.

If the power button of device 20 is pressed, the screen 24 brightness is increased significantly. This overrides the brightness adjustment algorithm temporarily until the screen is turned off, and normal screen brightness adjustment resumes when the screen 24 turns back on again.

The light sensor functionality set forth herein may be altered or disabled by the user via an "Automatic Backlight" option accessible through a Screen/Keyboard options screen displayed by device 20. This enables backlight functionality which allows the user to press the power button to cycle between 1) user-selected brightness; 2) super-bright; and 3)

backlight/LCD off. When the LCD screen 24 is on, the keypad 34 backlight is always on. When the LCD screen 24 is off, the keypad 34 backlight is always off.

While the embodiments described herein are directed to particular implementations of the method for automatically adjusting screen and keypad brightness on a mobile handheld electronic device, it will be understood that modifications and variations to these embodiments are within the scope and sphere of the present application. For example, as indicated above the backlighting brightness adjustment methodology set forth herein is not limit in its application to handheld electronic devices but may advantageously applied to other electronic devices such as desktop computers, cellular telephones, GPS receivers, smart telephones, and laptop computers. Also, it is contemplated that the keypad backlighting, although independent of LCD screen backlighting adjustment, may advantageously transition between various lighting modes (such as DIM, OFFICE and BRIGHT) rather than simply switching between ON and OFF. Many other modifications and variations may occur to those skilled in the art. All such modifications and variations are believed to be within the sphere and scope of the present application.

What is claimed is:

1. A method for automatically adjusting screen and keypad brightness on a mobile electronic device having a light sensor, display screen and keypad, comprising:

obtaining light level samples from said light sensor; and independently adjusting backlight intensity of said display screen and keypad responsive to said light level samples, wherein adjusting the backlight intensity of said display screen further includes comparing a median value of said samples to respective threshold values corresponding to a DIM mode, wherein said backlight intensity is dimmed for low lighting environment, an OFFICE mode, wherein said backlight intensity is set to a brightness that is higher than in said DIM mode and a BRIGHT mode of backlight intensity, wherein said backlight intensity is set at full brightness, and wherein said backlight intensity is adjusted from DIM mode to OFFICE mode in the event said median value of said samples is greater than a first threshold, wherein said backlight intensity is adjusted from DIM mode to BRIGHT mode in the event said median value of said samples is greater than a second threshold, wherein said second threshold is greater than said first threshold, wherein said backlight intensity is adjusted from OFFICE mode to DIM mode in the event said median value of said samples is less than a third threshold, wherein said third threshold is less than said first threshold, wherein said backlight intensity is adjusted from OFFICE mode to BRIGHT mode in the event said median value of said samples is greater than said second threshold, wherein said backlight intensity is adjusted from BRIGHT mode to DIM mode in the event said median value of said samples is less than said third threshold, and wherein said backlight intensity is adjusted from BRIGHT mode to OFFICE mode in the event said median value of said samples is less than a fourth threshold, wherein said fourth threshold is intermediate said first threshold and said second threshold, wherein the backlight intensity of said keypad is adjusted from an OFF mode to an ON mode in the event a current light level sample is less than a fifth threshold value, wherein said fifth threshold value is intermediate said first threshold and said third threshold and from an ON mode to an OFF mode in the event said current light level sample is greater than a sixth threshold value for a predetermined time period, wherein said sixth threshold value is intermediate said first threshold value and said fourth threshold value.

2. The method of claim 1, wherein said fifth threshold value is approximately 60 Lux.

3. The method of claim 2, wherein said sixth threshold value is approximately 250 Lux and said predetermined time period is approximately 30 seconds.

4. The method of claim 1, wherein said light level samples are obtained at a first sampling rate upon activation of said light sensor or in the event of a transition from said DIM mode to said OFFICE or BRIGHT modes or from said OFFICE mode to said BRIGHT mode, and otherwise a second sampling rate.

5. The method of claim 4, wherein said median value is calculated from five consecutive ones of said light level samples.

6. The method of claim 5 wherein said first sampling rate is maintained for five samples whereupon further light level samples are obtained at said second sampling rate.

7. The method of claim 6, wherein said first sampling rate is one sample per approximately 400 ms and said second sampling rate is one sample per approximately 1.2 ms.

8. The method of claim 7, wherein said first and second sampling rates are each subject to a variance of approximately +/−12.5%.

9. The method of claim 5, wherein said median value is calculated by sorting and selecting the third of said five samples.

10. The method of claim 1, wherein the backlight intensity of said keypad is adjusted from an ON mode to OFF mode in response to consecutive light level samples greater than said second threshold value for approximately 30 seconds.

11. The method of claim 1 wherein adjustment of the backlight intensity of said display screen and said keypad from brighter to dimmer is gradual whereas adjustment of the backlight intensity of said display screen and said keypad from dimmer to brighter is quick.

12. The method of claim 1, wherein said first threshold value is approximately 70 Lux, said second threshold value is approximately 4400 Lux, said third threshold value is approximately 16 Lux and said fourth threshold value is approximately 3000 Lux.

* * * * *